United States Patent [19]
Gordon
[11] Patent Number: 5,055,026
[45] Date of Patent: Oct. 8, 1991

[54] POSITION DETECTOR FOR A MULTI-GATE VALVE ASSEMBLY

[75] Inventor: Edward A. Gordon, Dothan, Ala.
[73] Assignee: Sony Corporation of America, Park Ridge, N.J.

[21] Appl. No.: 537,826
[22] Filed: Jun. 14, 1990
[51] Int. Cl.$^5$ .............................................. B29C 45/23
[52] U.S. Cl. .................................. 425/146; 264/40.5; 264/40.7; 425/171; 425/564; 425/566
[58] Field of Search ............... 425/135, 145, 146, 150, 425/169, 171, 566, 562, 564; 264/40.5, 40.7

[56] References Cited

U.S. PATENT DOCUMENTS 2,627,087 2/1953 Hendry .............................. 425/145
4,662,837 5/1987 Anderson ........................... 425/566

*Primary Examiner*—Timothy Heitbrink
*Attorney, Agent, or Firm*—Alvin Sinderbrand; William S. Frommer

[57] ABSTRACT

A position detector to detect the fully open position of a valve gate pin in a gate valve controlling the flow of molten plastic material to a die cavity includes a sensing member which has a DC voltage impressed thereon and which is electrically isolated from the valve gate assembly. An extension of the valve gate pin contacts the sensing member when the valve gate pin is in its fully open position to short the impressed voltage and thereby indicate a fully open condition.

8 Claims, 2 Drawing Sheets

FIG. 3
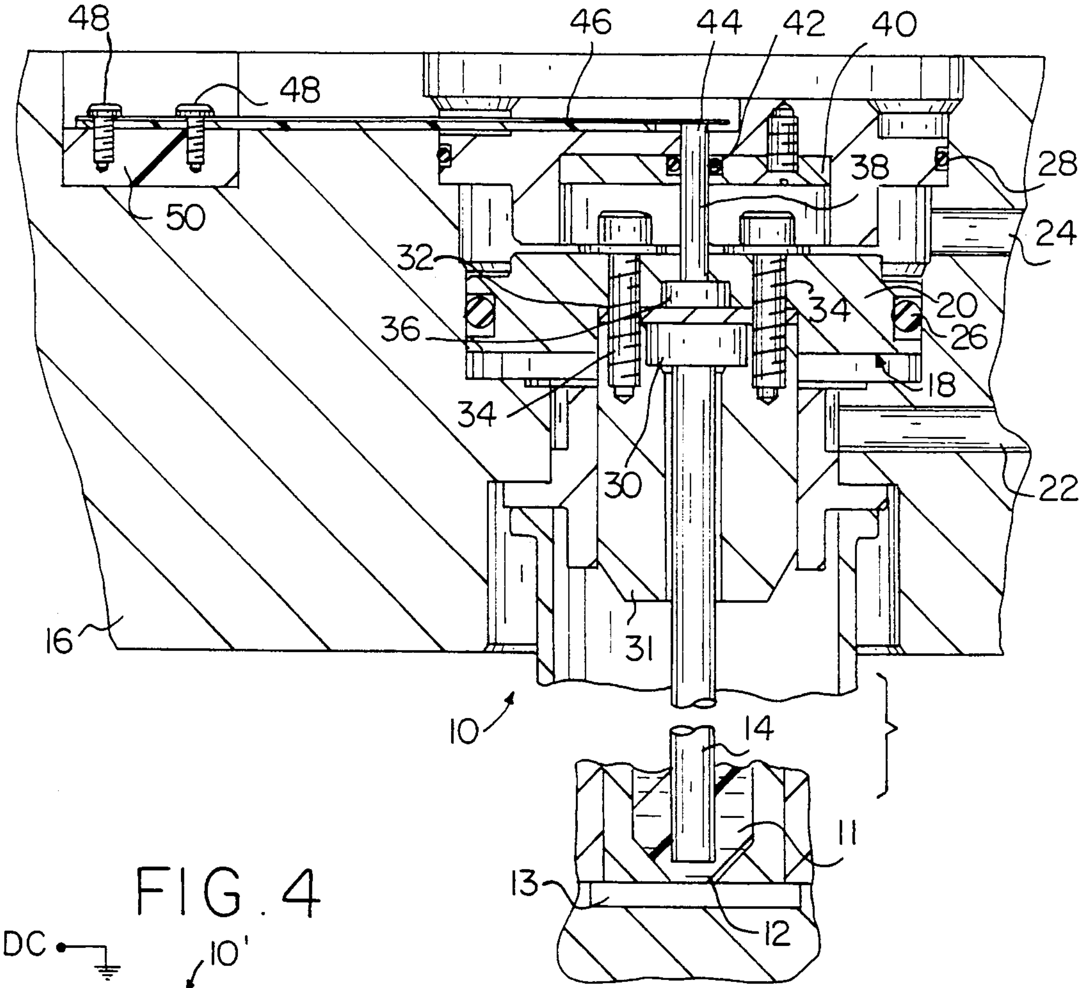
FIG. 4
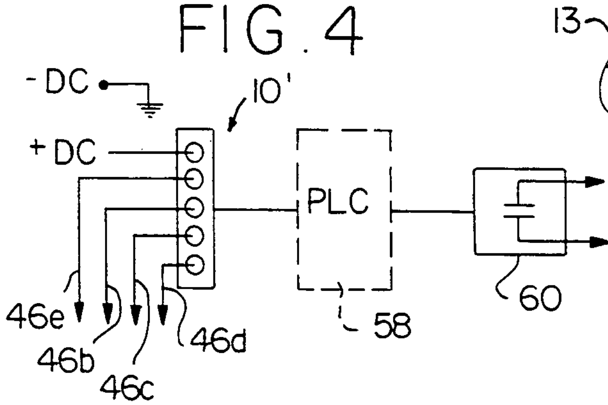
FIG. 5
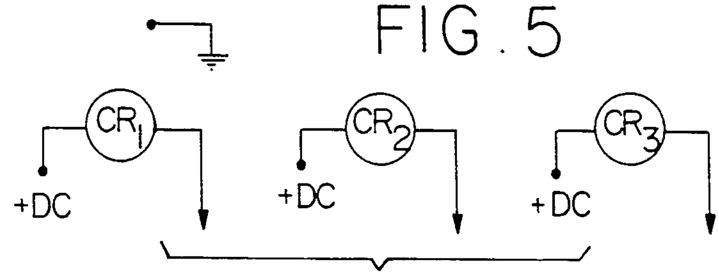
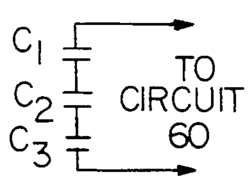
FIG. 6

POSITION DETECTOR FOR A MULTI-GATE VALVE ASSEMBLY

BACKGROUND OF THE INVENTION

1. Field of the Invention

This invention relates to valve gates used in injection molding of thermoplastic material, and more particularly relates to a position detector to indicate the fully opened position of such a valve gate.

2. Description of the Prior Art

In the injection molding of plastic parts, such as audio or video cassette casings, which are manufactured in great quantities, a plurality of injection mold cavities are used in the molding process. Typically the flow of molten plastic material to the injection mold cavities is controlled by valve gates which have valve pins reciprocating between a closed position precluding the flow of molten plastic material, and an open position permitting molten plastic material to flow through the valve gates to respective mold cavities. Where the flow of material to a multiplicity of injection mold cavities is controlled by a number of valve gates, it is necessary that all of the valve pins in all of the valve gates be in a fully opened position before molten plastic flows. This is necessary to avoid underfilling or overfilling any injection mold cavity.

Heretofore, problems have developed in such situations where one or more valve gates are not in a fully opened position at the time molten plastic material is introduced in the injection molding process. When not all valve gates are in a fully opened position, underfilling of selected injection mold cavities and overfilling of adjacent mold cavities results so that some parts being molded are defective resulting in undesirable parts which must be scrapped or even in damage to the mold cavities themselves.

OBJECTS AND SUMMARY OF THE INVENTION

It is therefore an object of the present invention to provide a device for monitoring the open position of a plurality of valve gates in a multi-cavity injection mold apparatus so that molten plastic material is not injected into the mold apparatus until all valve gates are in a fully opened position.

It is a further object of the present invention to provide a device for monitoring the open position of valve gates in a multi-cavity injection mold apparatus without increasing the overall thickness of the mold.

A still further object of the present invention is to provide a device for electrically monitoring the open position of valve gates in a multi-cavity injection mold apparatus which can be incorporated in existing injection mold apparatus.

A still further object of the present invention is to provide a simple and expedient device to improve the quality of injection molding of a plurality of plastic parts in a multi-cavity injection molding operation by insuring that all valve gates in a multiple valve gate injection molding operation are fully opened before molten plastic material is injected into the mold cavities.

The above, and other objects, features and advantages of the present invention, are achieved by providing a sensing member in juxtaposition to an upward extension of a valve gate pin. The extension of the valve gate pin member contacts the sensing member and thereby closes an electrical circuit when the valve gate pin is moved to its fully opened position. A programmable logic control unit or a series of relay coils is utilized to sense that each valve gate pin in the system is in its upward, fully opened position before initiating a signal to permit flow of molten plastic to each injection mold cavity.

Preferably, the sensing member is an electrical contact member on which is impressed a low voltage signal. The sensing or contact member is electrically isolated from the housing of the mold apparatus and is normally spaced from the extension of the valve gate pin except when the latter is in its fully opened or upward position. When the sensing member is contacted by the raised valve gate pin extension, the low voltage signal is electrically shorted through the housing and such condition is sensed. Once every contact or sensing member in the multi-cavity injection mold apparatus is shorted, flow of molten plastic is initiated.

BRIEF DESCRIPTION OF THE DRAWINGS

FIG. 3 is a view similar to FIG. 2, but showing the valve gate assembly in its upward or open position to permit flow of molten plastic material; and FIGS. 4, 5 and 6 are schematic representations of control circuits which may be utilized with the detecting device according to the present invention.

DESCRIPTION OF A PREFERRED EMBODIMENT OF THE INVENTION

Figure 1:
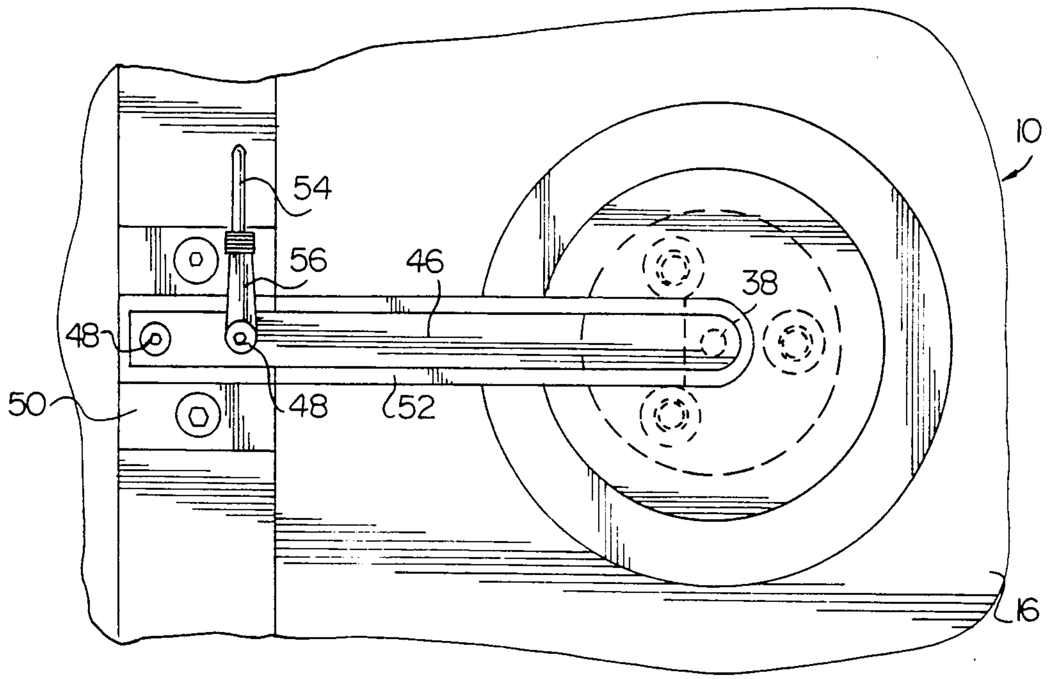
FIG. 1 is a top plan view showing a position detecting device according to an embodiment of the present invention on a typical valve gate assembly.
Figure 2:
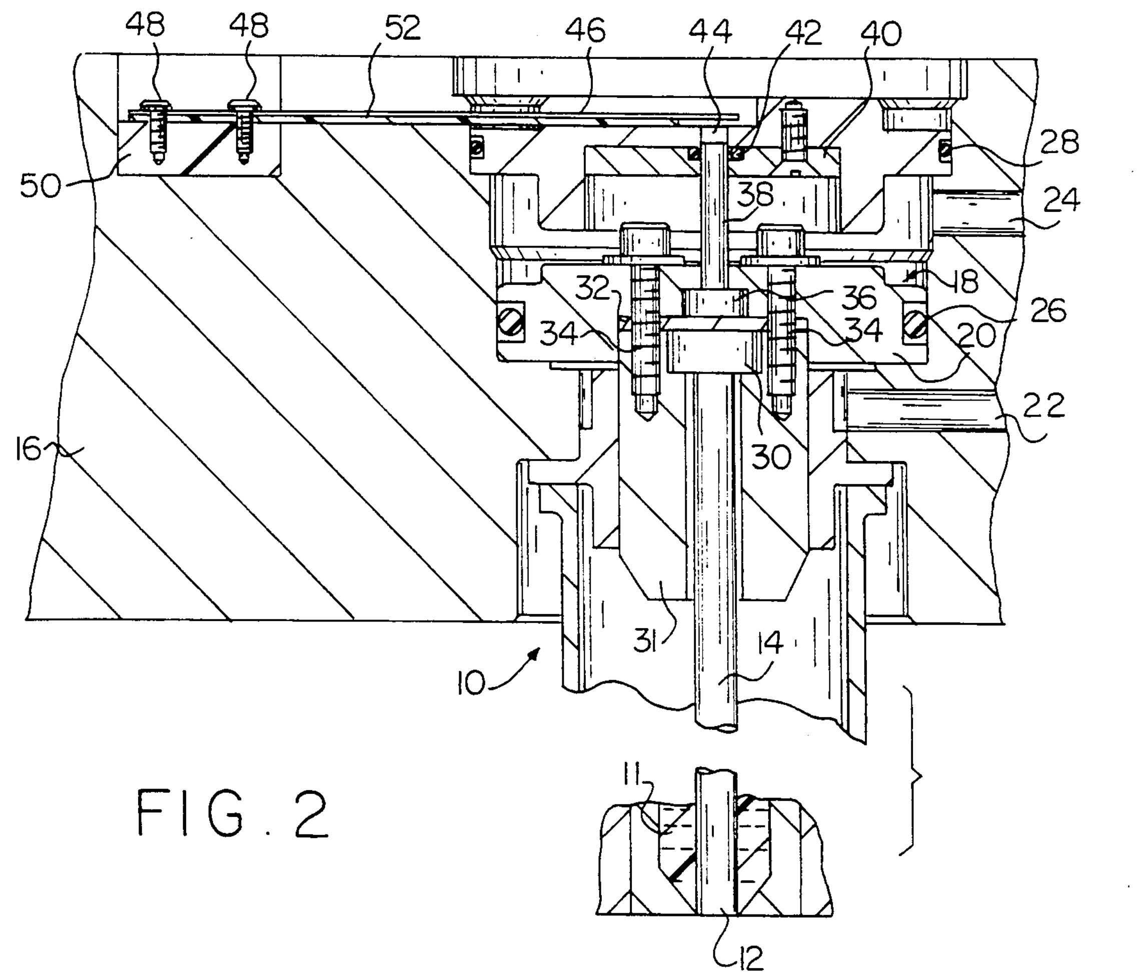
FIG. 2 is an elevational view, partly in section, of the valve gate assembly and position detecting device of FIG. 1, with the valve gate assembly shown in its closed position to preclude flow of molten plastic material.

With reference to FIGS. 1, 2 and 3, there is shown a valve gate assembly 10 for use in an injection molding operation. Valve gate assembly 10 controls the flow of molten plastic from a flow bore 11 through an outlet orifice 12 to a respective mold cavity 13 (FIG. 3) in an injection mold to form parts of any desired shape in an injection molding operation. A reciprocating valve pin 14 moves from a closed position, shown in FIG. 2, upwardly to an open position, shown in FIG. 3, to permit flow of molten plastic material to the respective mold cavity 13. In practice, when molding a number of similarly shaped parts on a production basis, a plurality of identical parts are molded in the same operation and a plurality of mold cavities are provided. Molten plastic is directed to these plurality of mold cavities simultaneously through the respective valve gate assemblies and it is important that a precisely metered, predetermined amount of molten plastic material be directed to each similar mold cavity in order to insure uniformity of the completed molded parts. Thus, if the valve gate pin 14 of any one of the valve gate assemblies is not in its fully opened position, shown in FIG. 3, at the time that the flow of molten plastic material to the flow bores 11 is initiated, there will be a restriction in the outlet orifice 12 of that valve gate assembly which will inhibit the flow of molten plastic material therethrough. The result is that an imprecise and improper amount of molten plastic material will be directed from the particular valve gate assembly which does not have a fully opened exit port or orifice 12. In addition, adjacent valve gates may pass an excess of plastic material resulting in overfilling of any associated mold cavity.

Valve gate assembly 10 is shown to include a grounded metal housing 16 in which is mounted a piston assembly 18 to control the reciprocating movement of valve pin 14 between its fully closed position, precluding flow of molten plastic material from outlet orifice 12, as shown in FIG. 2, and its opened or raised position, shown in FIG. 3, permitting flow of molten plastic material through outlet orifice 12 to a mold cavity.

Piston assembly 18 is operable under fluid pressure and includes a piston 20 which is movable between a first lower position, as shown in FIG. 2, and a second upper position as shown in FIG. 3, in response to the introduction of fluid under pressure through inlet ports 22 and 24 in housing 16. Thus, with the valve pin 14 in its closed position, as shown in FIG. 2, introduction of fluid under pressure through inlet port 22 acts on the lower face of piston 20 causing the latter to move upward and carrying valve pin 14 to its upward position. Closing of the valve gate is initiated by introduction of fluid under pressure through inlet port 24 so as to act on the upper surface of piston 20 and thereby return the valve pin 14 to its closed position. An appropriate seal 26 is provided on piston 20 and an additional seal 28 is provided above passage 24.

Valve pin 14 is integral, at its upper end, with an enlarged diameter portion 30 from which a flange 32 extends. The pin 14 extends axially through a bushing 31 which is counter-bored at its upper end to receive the enlarged portion 30. Screws 34 extend through piston 20 and flange 32 into tapped bores in bushing 31 for securing piston 20 to valve pin 14. A shoulder 36 is provided extending upwardly from flange 32 and an extension 38 of valve pin 14 extends upwardly from shoulder 36 out of piston 20 and through a cover plate 40 and a seal 42. The length of the extension 38 is selected so that, in the opened position of the valve pin 14 shown in FIG. 3, the end 44 of the extension 38 is raised above the surface of cover plate 40 so as to contact a sensing or contact member 46 which may be a metallic leaf spring.

Contact member 46 is mounted on the conductive metal housing 16 by screws 48 extending into an insulated block 50 and rests on an insulating strip 52 so as to be electrically isolated from housing 16. Each sensing or contact member 46 is connected through a wire 54 and connector 56 (FIG. 1) to the positive terminal of a low voltage DC signal source. Valve pin 14 and its upper end 44, because of its metal-to-metal contact with the grounded housing 16, are also grounded.

In one embodiment, as shown in FIG. 4, each of the sensing or contact members **46*a*–46*d* associated with respective valve gates of a multi-gate valve assembly 10′ is connected to a programmable logic circuit (PLC) 58 which controls a molding machine injection permit circuit 60. Thus, when the PLC 58 indicates that all of the sensing or contact members 46*a* to 46*d* have been shorted, a signal is generated by the PLC 58 which causes circuit 60 to initiate the flow of molten plastic material to the flow bores 11 of the several valve gates. If one or more of the contact members 46*a*–46*d*** is not shorted, no injection permit signal is generated.

FIGS. 5 and 6 show an alternative arrangement for an injection permit circuit. In this embodiment, each sensing or contact member 46 is connected to a respective relay coil CR1, CR2, etc. (FIG. 5). When a contact member 46 is contacted by the end 44 of the respective valve pin 14, the corresponding one of the relay coils CR1, CR2, etc. is shorted, thus closing the corresponding one of the relay contacts C1, C2, etc. which are connected in series (FIG. 6). When all of the contacts C1, C2 etc. have been closed, current flows to the circuit 60 which provides the injection permit signal to initiate flow of molten plastic material to the flow bore 11 of each valve gate. If any relay contact does not close, no current flows and no injection permit signal is generated.

It is thus seen that the present invention provides a simple but effective fail safe method of insuring that every valve gate in a multi-cavity injection molding apparatus is in a fully open position before flow of molten plastic is initiated to a plurality of valve gates over a plurality of mold cavities. In this way, inconsistently filled or partially filled mold cavities, as well as overfilled cavities, are precluded. This avoids production of molded parts which must be scrapped and avoidance of damage to the mold cavities themselves. It is noted that the present invention may be used with equal applicability in connection with a single valve gate feeding a single mold cavity to insure that molten plastic does not flow until the valve gate pin is in its fully open position.

It is also to be noted that the addition of the sensing or contact member 46 to the valve gate 10 does not appreciably increase the height or thickness of the injection molding apparatus, so that the invention can be readily applied to existing injection molding apparatus.

Although illustrative embodiments of the invention have been described in detail herein with response to the accompanying drawings, it is to be noted that the invention is not limited to those precise embodiments, and that various changes and modifications may be effected therein by one skilled in the art without departing from the scope or spirit of the invention as defined in the appended claims.

What is claimed is:

1. A multi-gate valve assembly for use in an injection molding apparatus, said assembly comprising:

a plurality of valve gates, each valve gate including a respective outlet orifice to direct a flow of molten plastic material to a respective mold cavity, each of said valve gates having a respective gate pin reciprocable relative to said valve gate between a closed position which precludes the flow of molten plastic material out of said respective outlet orifice and an open position permitting the flow of molten plastic material out of said respective outlet orifice into said respective mold cavity, detection means associated with each of said valve gates for detecting when the gate pin of the gate pin of the respective gate is in said open position, and control means responsive to said detection means to permit a flow of molten plastic material to said valve gates only when said detection means associated with all of said valve gates detect that the respective gate pins are in said open position.

2. A multi-gate valve assembly as in claim 1, wherein each said detection means for detecting when the respective gate pin is in said open position includes a respective contact member in juxtaposition to said respective gate pin.

3. A multi-gate valve assembly as in claim 2, wherein each said gate pin includes an end section which contains the respective contact member only when said gate pin is in said open position.

4. A multi-gate valve assembly as in claim 3, wherein said control means includes electrical circuit means associated with each said contact member for detecting when said respective gate pin contacts said contact member.

5. A multi-gate valve assembly as in claim 4, wherein each said contact member is electrically isolated from said multi-gate valve assembly and has a DC voltage impressed thereon, and each said gate pin is grounded.

6. A multi-gate valve assembly as in claim 5, wherein each said electrical circuit means is shorted when the respective gate pin is in its said open position so as to contact said contact member.

7. A multi-gate valve assembly as in claim 6, wherein said control means further includes a programmable logic circuit which responds to shorting of said electrical circuit means by contact of all of said gate pins with the respective contact members for permitting said flow of molten plastic material to said valve gates.

8. A multi-gate valve assembly as in claim 6, wherein said control means includes a plurality of relay coils associated with said valve gates, respectively, and being energized when the respective gate pins contact the respective contact members, said relay coils controlling respective relay contacts which are connected in series to permit said flow of molten plastic material to said valve gates only when all of said relay coils are energized.

* * * * *